(12) United States Patent
Ejiri

(10) Patent No.: US 8,380,666 B2
(45) Date of Patent: Feb. 19, 2013

(54) FILE MANAGEMENT DEVICE AND STORAGE DEVICE FOR MANAGING MAPPING INFORMATION BETWEEN A FIRST FILE SYSTEM AND A SECOND FILE SYSTEM

(75) Inventor: Taichi Ejiri, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 743 days.

(21) Appl. No.: 12/251,762

(22) Filed: Oct. 15, 2008

(65) Prior Publication Data

US 2009/0112950 A1    Apr. 30, 2009

(30) Foreign Application Priority Data

Oct. 16, 2007   (JP) ................. 2007-269419

(51) Int. Cl.
*G06F 17/30* (2006.01)
(52) U.S. Cl. .......... 707/621; 707/823; 707/824
(58) Field of Classification Search .......... 707/621, 707/821–824, 999.107, 999.205
See application file for complete search history.

(56) References Cited

U.S. PATENT DOCUMENTS

| 2003/0149753 | A1* | 8/2003 | Lamb | 709/223 |
| 2003/0167327 | A1* | 9/2003 | Baldwin et al. | 709/225 |
| 2003/0177168 | A1* | 9/2003 | Heitman et al. | 709/201 |
| 2006/0184794 | A1* | 8/2006 | Desselle et al. | 713/166 |
| 2007/0203937 | A1* | 8/2007 | Prahlad et al. | 707/102 |

FOREIGN PATENT DOCUMENTS

| JP | 2001-325128 | 11/2001 |
| JP | 2004-288007 | 10/2004 |
| JP | 2006-059261 | 3/2006 |
| JP | 2006-523882 | 10/2006 |

OTHER PUBLICATIONS

Japanese Office Action with English translation mailed Sep. 4, 2012, in Japanese Patent Application No. 2007-269419, filed Oct. 16, 2007.

* cited by examiner

*Primary Examiner* — Leslie Wong
(74) *Attorney, Agent, or Firm* — Oblon, Spivak, McClelland, Maier & Neustadt, L.L.P.

(57) ABSTRACT

A file system management device is connectable to a storage device. The storage device includes a first file system entity created according to a first file system in which a second file system entity created according to a second file system is allowed to be mapped. A mapping information storing area is defined on a predetermined area of the first file system entity, and the mapping information storing area is reserved for storing mapping information indicating a correspondence of the mapping. The file system management device includes an accessing unit configured to access the second file system entity based on the mapping information through a process according to the first file system to the first file system entity.

14 Claims, 12 Drawing Sheets

FIG. 7

| BPB | FAT | DEs / Contents |

FILE MANAGEMENT DEVICE AND STORAGE DEVICE FOR MANAGING MAPPING INFORMATION BETWEEN A FIRST FILE SYSTEM AND A SECOND FILE SYSTEM

CROSS-REFERENCE TO RELATED APPLICATIONS

This application is based upon and claims the benefit of priority from Japanese Patent Application No. 2007-269419 filed on Oct. 16, 2007, the entire contents of which are incorporated herein by reference.

TECHNICAL FIELD

The present invention relates to a file management device and a storage device.

BACKGROUND

Managing a storage area of a storage device for a computer by a file system requires a mapping/interpreting function supporting the file system, and this function has to be mounted on a software or a hardware.

The mount of the mapping function on the hardware increases cost and complicates the hardware. Therefore, the mapping/interpreting function is mounted on the software in general. Some widely-spread operating systems (OS) provides mapping/interpreting function supporting some file systems in advance.

In the case of employing a file system not supported by an OS (hereinafter called a unique file system), there are two methods for providing the mapping/interpreting function as follows.

The first method is locating a unique file system entity directly on a physical storage area and interpreting the file system by a kernel mode software (in general, a file system driver) which supports the unique file system and has the same interface as interpretation software for the OS. Hereinafter, this accessing method is called as a kernel mode access.

In this case, a user can access a file disposed on the unique file system by the user interface (UI) for the OS.

However, according to this method, it is necessary to install the kernel mode software on the OS. Thus, under the log-in environment where the installation of the kernel mode software is inhibited according to the security policy, it is necessary to install the kernel mode software after switching an administrator mode into the log-in circumstance allowing the installation of the kernel mode software. This will be a large load for a company where an administrator manages personal computers for several tens or several hundreds persons.

The second method is locating the unique file system entity within a file system entity supported by the OS (herein after called a standard file system). Hereinafter, this system is called a double file system structure. In this case, since the unique file system entity is recognized as a single or a plurality of file images defined by the standard file system, it is possible to access the unique file system entity when a unique user mode application having a function of interpreting the unique file system accesses the single or the plurality of file images (hereinafter called a user mode access).

According to the second method, the unique file system is accessible without installing the kernel mode software, and there is no problem of the first method even under the login environment with a strict security policy. However, according to this method, since the file is operated by a unique UI of the unique application, a user must operate the file with the operability different from the UI of the OS.

JP-T-2006-523882 discloses a method for mutually relating a first file system and a second file system.

If a single unique file system can be accessed by the above two methods, improved utility can be provided. For example, it is possible to provide a utilizing method as follows: for a personal computer which frequently uses the unique file system, the kernel access mode is employed to improve the utility; and for a personal computer which temporarily uses the unique file system, the user access mode is employed to improve the operability.

Although the double file system structure allows this utilization method, there may arise two problems.

The first problem is that since the OS analyzes the double file system structure, the performance is degraded and the utilizing ratio of a CPU increases as compared with mapping a single file system structure.

Since the kernel access mode is intended to a frequent use, it is desirable to prevent the degradation of the performance and the increase of the utilizing ratio of the CPU, which is a first object.

The second problem is that in the case of recognizing the unique file system entity as a file image, there arises a risk that the unique file system entity may be deleted or modified by a procedure of deleting or modifying a single file system.

Since a plurality of files (several thousand or several ten thousand files in some case) may be deleted simultaneously in response to an operation of deleting a single file by a user, such the risk caused by an erroneous operation of a user is high, and a second object is to prevent this problem.

JP-T-2006-523882 discloses a system in which a recording medium employing the first file system is accessed via an interface employing the second file system. Such the double file system structure can not be employed.

SUMMARY

The invention has been made in view of the aforesaid objects, and an object of the invention is to provide a file system and a computer readable recording medium which provide the improved utility by using the kernel access mode as to a single unique file system and also provide the improved operability by using the user access mode.

According to a first aspect of the invention, there is provided a file system management device connectable to a storage device, the storage device comprising a first file system entity created according to a first file system in which a second file system entity created according to a second file system is allowed to be mapped, wherein a mapping information storing area is defined on a predetermined area of the first file system entity, the mapping information storing area being reserved for storing mapping information indicating a correspondence of the mapping, said file system management device comprising: an accessing unit configured to access the second file system entity based on the mapping information through a process according to the first file system to the first file system entity.

According to a second aspect of the invention, there is provided a file system management device connectable to a storage device, said file system management device comprising: a file system allocating unit configured to allocate a first file system entity created according to a first file system, such that a second file system entity created according to a second file system is allowed to be mapped within the first file system entity, wherein the file system allocating unit is configured to define a mapping information storing area on a predetermined area of the first file system entity, the mapping information storing area being reserved for storing mapping information indicating a correspondence of the mapping.

According to a third aspect of the invention, there is provided a storage device comprising: a first file system entity created according to a first file system in which a second file system entity created according to a second file system is allowed to be mapped; and a mapping information storing area defined on a predetermined area of the first file system entity, the mapping information storing area being reserved for storing mapping information indicating a correspondence of the mapping.

According to a fourth aspect of the invention, there is provided a computer-readable medium having a computer program stored thereon and readable by a computer, said computer program, when executed by the computer, causes the computer to perform operations for a file system management device connectable to a storage device, the storage device comprising a first file system entity created according to a first file system in which a second file system entity created according to a second file system is allowed to be mapped, wherein a mapping information storing area is defined on a predetermined area of the first file system entity, the mapping information storing area being reserved for storing mapping information indicating a correspondence of the mapping, said operations comprising: processing the first file system entity according to the first file system; obtaining the mapping information by the process to the first file system entity; and accessing the second file system entity based on the mapping information.

According to a fifth aspect of the invention, there is provided a computer-readable medium having a computer program stored thereon and readable by a computer, said computer program, when executed by the computer, causes the computer to perform operations for a file system management device connectable to a storage device, said operations comprising: allocating a first file system entity created according to a first file system, such that a second file system entity created according to a second file system is allowed to be mapped within the first file system entity; and defining a mapping information storing area on a predetermined area of the first file system entity, the mapping information storing area being reserved for storing mapping information indicating a correspondence of the mapping.

BRIEF DESCRIPTION OF THE DRAWINGS

FIG. 7 is a diagram showing an image of an accessing state on a sector unit basis on the USB flash memory after the authentication;

DESCRIPTION

Figure 1:
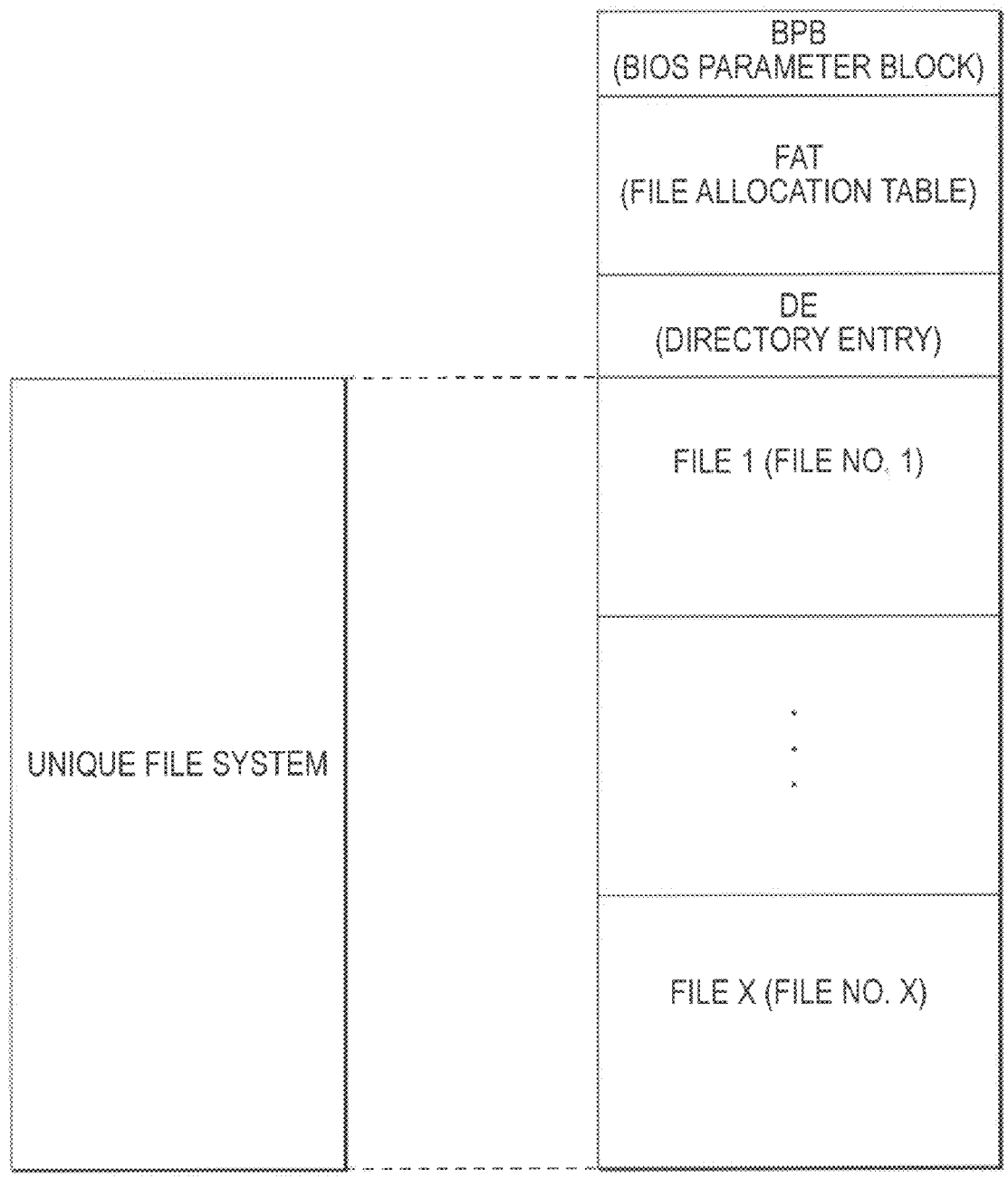
FIG. 1 is a diagram showing the file system entity of the file system of a recording medium according to an embodiment of the invention.

According to an aspect of the invention, there is provided a storage device in which a second file system entity according to a second file system is mapped on a first file system entity according to a first file system, and the correspondence of the mapping is stored on a predetermined area of the first file system entity as mapping information.

Further, there is provided software for the second file system. The software for the second file system, when executed by the computer, causes the computer to perform operations as follows: accessing the second file system entity according to the second file system based on the mapping information while processing the first file system entity according to the first file system.

According to this aspect of the invention, it is possible to access the second file system entity while using the first file system entity as a subject to be processed based on the information of the second file system entity mapped on the first file system entity.

For example, at an initial stage for interpreting a double file system by the kernel mode accessing, the physical address location information (mapping information) of a unique file system entity (second file system entity) is obtained and held. At the time of accessing the unique file system entity thereafter, the storage area can directly be accessed with reference to the physical address location information thus held.

Thus, it becomes unnecessary to analyze the double file system structure within an OS and so the degradation of the performance and the increase of the utilizing ratio of a CPU can be prevented.

The storage area (location) of the mapping information can be set suitably. As an example, the mapping information may contain a physical address of the second file system entity, and the mapping information may be located at an unused area of the particular location of the first file system entity.

Accordingly, the physical address of the second file system entity is stored on the unused area of the particular location of the first file system entity. Since the physical address is stored on the unused area, the first file system can also be stored thereon. Since the physical address is stored at the particular location, the address can be read without analyzing the first file system. Of course, since the physical address is stored, thereafter, the address can also be read without analyzing the first file system.

It is also possible to analyze the first file system based on its algorithm to thereby search the location of the second file system entity as the unique file system.

The file system may have an access control function that disables writing and/or erasing operations of the first file system entity, on which the second file system entity is mapped, due to an erroneous operation according to the first file system, to increase the reliability of the file system.

According to this function, since the second file system entity is mapped within the first file system entity, a user can originally delete the first file system entity according to the first file system. When the first file system entity includes a plurality of the second file system entities, at worst all the second file system entities may be broken. However, for example, even if a user tries to perform the deletion etc. of the first file system entity by an operation according to the first file system, the access control function disables writing and/or erasing operations.

There are various kinds of specific examples for realizing the access control function. As an example of the access control function, the writing and/or erasing operations according to the first file system to an attribute of the first file system entity is disabled at a time of initial starting, the writing and/or erasing operations according to the first file system to the attribute of the first file system entity is allowed at a time of accessing the second file system entity according to the second system entity, and the writing and/or erasing operations according to the first file system to the attribute of the first file system entity is again disabled at a time of completing the accessing.

Accordingly, at the time of the initial starting, the access control function disables the writing and/or erasing operations of the attribute of the first file system entity from an operation according to the first file system. Thus, even if a user performs an operation according to the first file system in this state, both the writing and the erasing operations are prevented. At a time of accessing the second file system entity according to the second system entity, since the attribute of the first file system entity is allowed to be written or erased, a desired accessing can be performed. Also in this case, a necessary file entity may be erased by an erroneous operation. However, since the operation is performed on the second file system, only a single or a plurality of files corresponding to the operation is influenced, which differs from a case where all the files are erased due to the erroneous operation of the first file system. At the time of completing the accessing by the operation according to the second file system, the attribute of the first file system entity is not allowed to be written or erased again. Thus, the writing and the erasing operations according to the first file system is prevented thereafter.

As an example for realizing such the function, the software for the second file system may be provided as a user mode application to be executed on an operating system, and at the time of starting the user mode application, the first file system entity may be exclusively opened while the attribute of the first file system entity is allowed to be written or erased, thereby the writing or erasing operation by others may be disabled based on a logical regulation of the operating system, and at the time of completion of the user mode application, the writing or erase of the attribute of the first file system entity may be disabled.

Accordingly, the software for the second file system is provided as the user mode application to be executed on the operating system. Thus, the operation of the second file system is restricted by the operating system. In this state, at the time of starting the user mode application, since the writing and/or erasing operations of the attribute of the first file system entity is allowed, the accessing is made possible. At this time, since the attribute may be erroneously written or erased by an access through the first file system by others than the user mode application, the first file system entity is exclusively opened to the user mode application. Thus, the writing and/or erasing operation of the attribute of the first file system entity by others is based on the logical regulation of the operating system. Then, at the time of completion of the user mode application, the writing and/or erasing operations of the attribute of the first file system entity is disabled, whereby the attribute is prevented from being written or erased by being accessed through the first file system.

As another example, the software for the second file system may be provided as a file system driver incorporated into an operating system and manage writing and/or erasing operations of the first file system entity.

Accordingly, the software for the second file system is provided as the file system driver incorporated into the operating system. Thus, the software enables the access to the file system in a state incorporated into the operating system. Further, the writing and/or erasing operations of the first file system entity is managed in the state of being incorporated into the operating system. Thus, it is possible to prevent a user etc. from erroneously operate to write or erase the first file system entity on which the second file system entity is mapped. Therefore, it is possible to prevent the many file system entities from instantaneously inaccessible.

The system may be understood that each of the elements may provide aspects of the invention. As an example, the aspects may include a computer-readable medium including a second file system entity according to the second file system mapped on a first file system entity according to the second file system, and a correspondence of the mapping being recorded on a predetermined area of the first file system as mapping information.

Similarly, aspects of the invention may include that the mapping information contains a physical address of the second file system entity and is stored on an unused area of a particular location of the first file system.

This system is not limited to a device and it will be understood easily that the system also acts as a method. Thus, it is true that the system is useful for the method as well as the device.

Software for realizing such the file system is recorded on a computer-readable medium and used. The computer-readable medium may be a magnetic recording medium or an optical recording medium. The computer-readable medium can be applied to computer-readable media that will be developed hereinafter. Furthermore, the computer-readable medium can be applied regardless of the copy stage such as the primary copy or the secondary copy. The supplying method of the software may also be applied in a case of using a communication line.

Further, the technical concept of the aspect may be applicable to a system partially realized by software and partially realized by a hardware, and the aspect can be applied to a mode where a part of the software is stored on the recording medium and read suitably therefrom.

In the case of realizing the aspect by a software, it is possible to configure the aspect so as to use a hardware or an operating system or also possible to configure the aspect without using a hardware or an operating system. For example, various kinds of the operating processes can be realized by reading a predetermined function of the operating system and performing the processing or by inputting data without reading such a function. Even if the aspect is actually realized by using the operating system, when the program is recorded on a computer-readable medium and such the media are distributed, it can be understood that the aspect can be implemented only by the program.

Further, in the case of implementing the aspect by using a software, of course, the aspect can be realized not only as a medium recording a program thereon but also as a program itself, and so the aspect includes a program itself.

In this specification, the "file system" is defined as a system and method for managing one or more files, and the "file system entity" is defined as any data managed in accordance with the file system. The "data" may contain user data such as a file and a folder and also may contain data other than the user data, such as data used for managing the user data according to the file system, e.g., attribute information. Also, the "file system entity" may include a format defined under the file system on a recording medium although no user data is stored on the file system. Therefore, when a storage device is formatted to support a predetermined file system (but user data has not been stored thereon), the entity of the predetermined file system is created and stored on the storage device.

Hereinafter, the illustrative embodiments according to the invention will be explained with reference to drawings.

Figure 11:
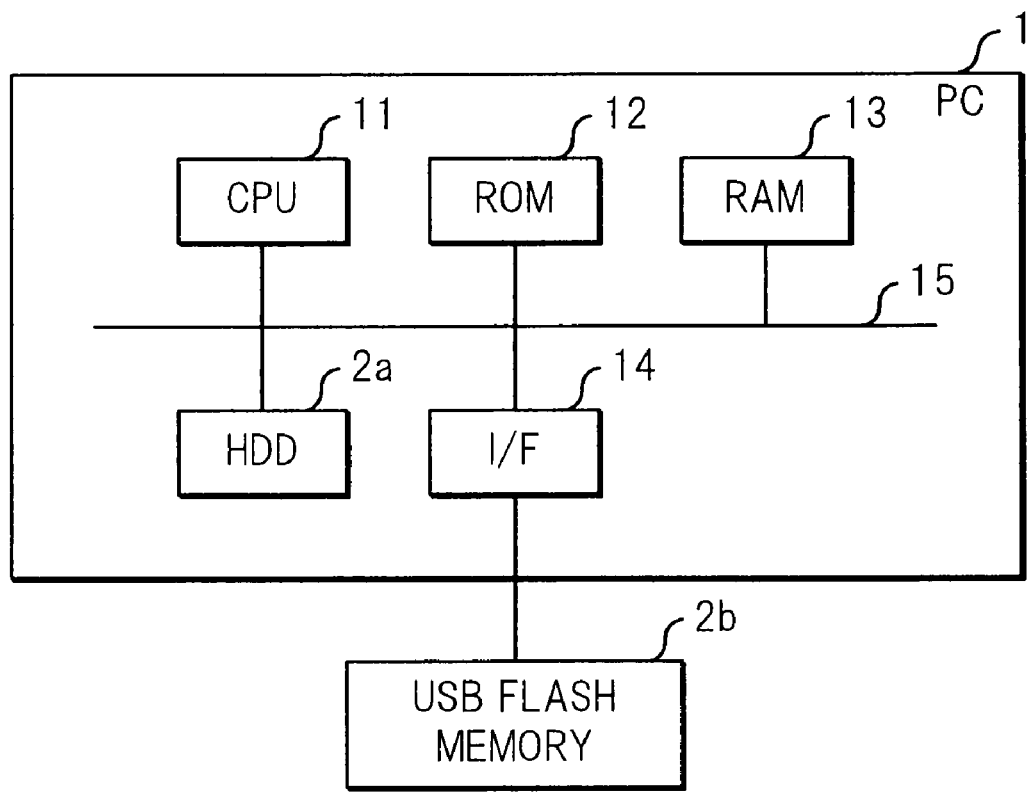
FIG. 11 is a schematic block diagram showing hardware of the system to which the file system of the embodiment is applicable.

FIG. 11 is a schematic diagram showing an exemplified system to which a file system according to an embodiment of the invention is applicable. The system includes a computer 1 and a storage device 2. The exemplified computer is a personal computer (PC) 1. The exemplified storage device 2 is a hard disk drive 2a and a USB flash memory 2b.

As shown in FIG. 11, the PC 1 includes a CPU (Central Processing Unit) 11; a ROM (Read Only Memory) 12; a RAM (Random Access Memory) 13; interface (I/F) 14; the hard disk drive (HDD) 2a serving as an example of the storage device 2; and a bus 15 interconnecting the CPU 11, the ROM 12, the RAM 13, the interface 14 and the hard disk drive 2a. The interface (I/F) 14 is configured to allow a connection with an external storage device such as the USB flash memory 2b serving as an example of the storage device 2.

The ROM 12 is a nonvolatile memory to retain data stored thereon even after the power is off, and the user mode application and/or the kernel mode software is stored on the ROM 12. When the application or software is executed by on the CPU 11, the PC 1 performs operations as a file system management device 100 (see FIG. 13) to manage the file system of the embodiment.

Figure 12:
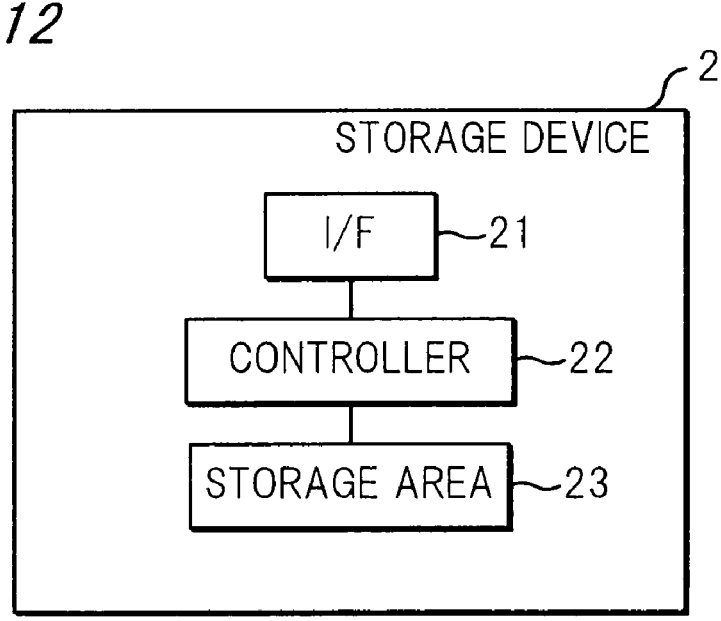
FIG. 12 is a schematic block diagram showing hardware of the storage device of the embodiment.

FIG. 12 is a schematic diagram showing hardware of the storage device 2. The storage device 2 includes an interface 21, a controller 22 and a storage area 23. When the hard disk drive 2a serves as the storage device 2, the interface 21 allows the communication with other elements of the PC 1 via the bus 15. When the USB flash memory 2b serves as the storage device 2, the interface allows the communication with the interface 14 of the PC 1. The controller 22 is configured to control the storage area 23 according to the command input. The storage area 23 is configured to store the file system entities of the embodiment therein.

Figure 13:
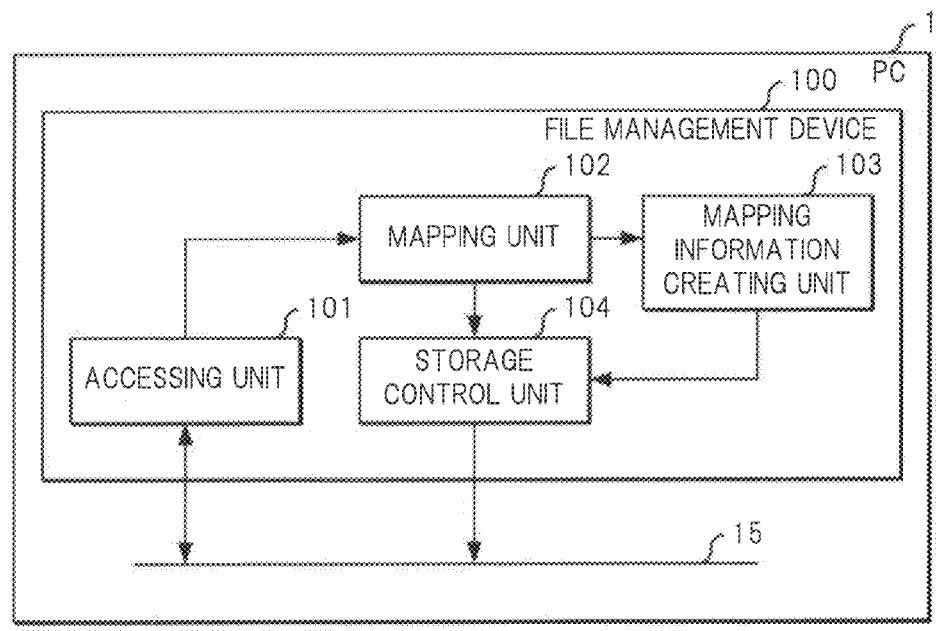
FIG. 13 is a functional block diagram of the file management device of the embodiment.
Figure 14:
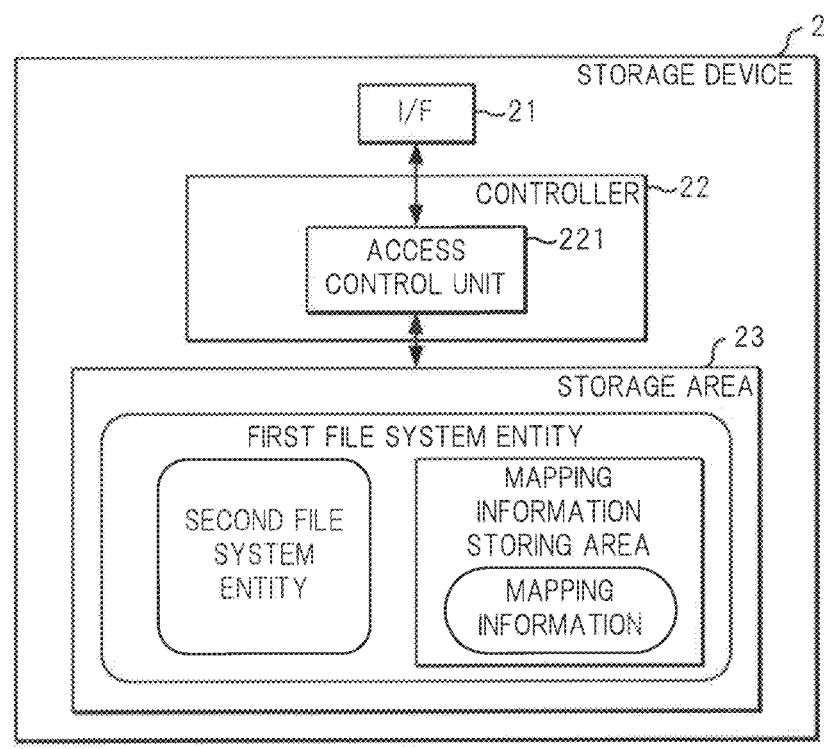
FIG. 14 is a functional bloc diagram of the storage device of the embodiment.

FIG. 13 and FIG. 14 are schematic functional block diagrams of the file management device 100 and the storage device 2, respectively.

As shown in FIG. 14, the controller 22 of the storage device 2 includes an access control unit 221. The storage area 23 of the storage device contains the first file system entity on which the second file system entity is mapped. The mapping information storing area is defined on the first file system entity. The mapping information indicates the correspondence between the second file system entity and the location thereof and is stored on the mapping information storing area.

As shown in FIG. 13, The file management device 100 includes an accessing unit 101, a mapping unit 102, a mapping information creating unit 103 and a storage control unit 104.

The accessing unit 101 is configured to access the file system entity stored on the storage device 2. In summary, in order to access the second file system entity, the accessing unit 101 firstly accesses and processes the first file system entity according to the first file system and then interprets the file system having double file system structure by obtaining the mapping information located on the first file system entity. Thereafter, the accessing unit 101 can access the second file system entity by using the mapping information.

When the second file system entity is operated (writing, erasing, etc.), the mapping unit 102 maps the second file system entity within the first file system entity. The mapping information creating unit 103 is configured to create the mapping information based on the output from the mapping unit 102.

The storage control unit 104 outputs, to the storage device 2 via the I/F 14, the command according to the mapping unit 102 and the mapping information output from the mapping information creating unit 103 such that the mapping information is stored on the mapping information storing area located defined on the first file system entity in the storage area 23 of the storage device 2.

FIG. 1 is a schematic diagram showing the file system entity of the file system of a recording medium according to the embodiment.

Even if the unique file system entity is disposed fragmentarily within a standard file system entity due to the characteristics of the standard file system, there is no problem so long as the physical addresses of all fragments are held.

However, the performance is degraded and the utilizing ratio of a CPU increases as the number of the fragments of the unique file system entity increases. Thus, it is preferable to dispose the unique file system entity in a manner that the number of the fragments thereof is made as small as possible.

FIG. 1 shows an example where an FAT (File Allocation Table) is employed as the first file system. When the FAT is selected as the standard file system (first file system), the unique file system entity can be disposed linearly. Further, even in the case where the unique file system (second file system) entity corresponds to a plurality of file images due to the capacity of the files within the FAT, the unique file system entity can be disposed linearly.

In FIG. 1, management areas, which include a BPB (bios parameter block), the FAT (file allocation table) and a DE (directory entry), are secured at the head portion of a storage area, and the succeeding area is defined as a file system area. This file system area is used as the area of the unique file system. This area is seen from the standard file system as if a plurality of tiles 1 to X (file No. 1 to file No. X) are stored.

The following two methods can be applied as a method for obtaining the physical address positional information of the unique file system entity by using the kernel mode software.

The first method is that the standard file system is analyzed based on the algorithm thereof to search the position of the unique file system entity.

The second method is that the physical address position of the unique file system entity is recorded in advance at the unused area of the particular position of the standard file system.

According to the first method, since the double file system structure is analyzed within the OS, the performance is degraded and the utilizing ratio of a CPU increases as compared with a case of mapping the single file system structure.

Thus, according to the embodiment, the second method is employed. However, the embodiment does not inherently deny the first method but it is possible to search the position of the unique file system entity by using the first method while also employing the second method.

Incidentally, the embodiment provides the following modes in the hardware or the firmware of the storage device in order to improve the reliability of the file system.

Mode 1:

The Mode 1 disables writing operation to an area including the file information corresponding to the unique file system entity, directory information located at the upper level of these files and the unique file system entity.

Mode 2:

The Mode 2 allows writing operation to an area including the unique file system entity.

The mode 1 is set at the time of turning on the power supply of the storage device or receiving a reset. Thus, it becomes impossible to delete a file corresponding to the unique file system entity.

On the other hand, at the time of accessing the unique file system entity, the user mode application is switched into the mode 2 just before the accessing to thereby exclusively open the file corresponding to the unique file system entity.

Thus, the unique file system is protected according to the logical regulation of the OS.

Then, the mode is again changed into the mode 1 at the time of closing the unique file system entity such as the exit of the application.

Next, the explanation will be made as to another embodiment in which an encryption area is used commonly between the kernel mode software and the user mode application.

The basic structure of the encryption area is an encrypted logical drive (hereinafter called an encrypted logical drive or a second file system).

In order to allow a user of a PC not installing the kernel mode software thereon to also access the encrypted logical drive from the application as the user's authority, a fake file system parameter is disposed on the physical drive to thereby recognize the encrypted logical drive entity (the second file system entity) as a file (the first file system entity) on the faked logical drive (hereinafter called a faked logical drive).

In this case, when the size of the encrypted logical drive is large, the encrypted logical drive is divided into a plurality of files and disposed on the faked logical drive.

Further, a function for not erasing the encrypted logical drive and the encrypted logical drive file in any PC environment is provided on the software or the hardware.

Figure 2:
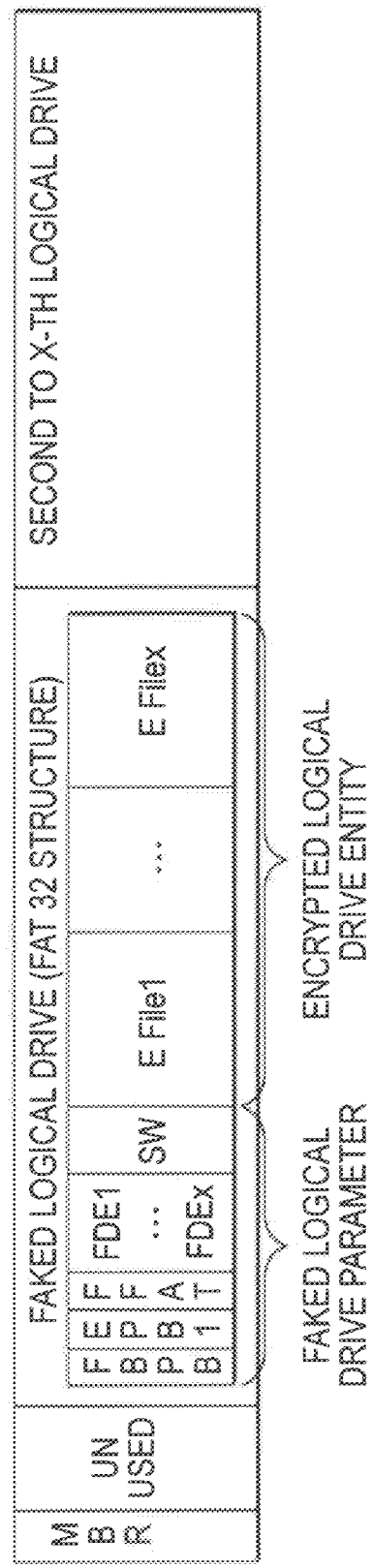
FIG. 2 is a diagram showing the physical allocation of the file system on a storage area in a case of a hard disc drive.
Figure 3:
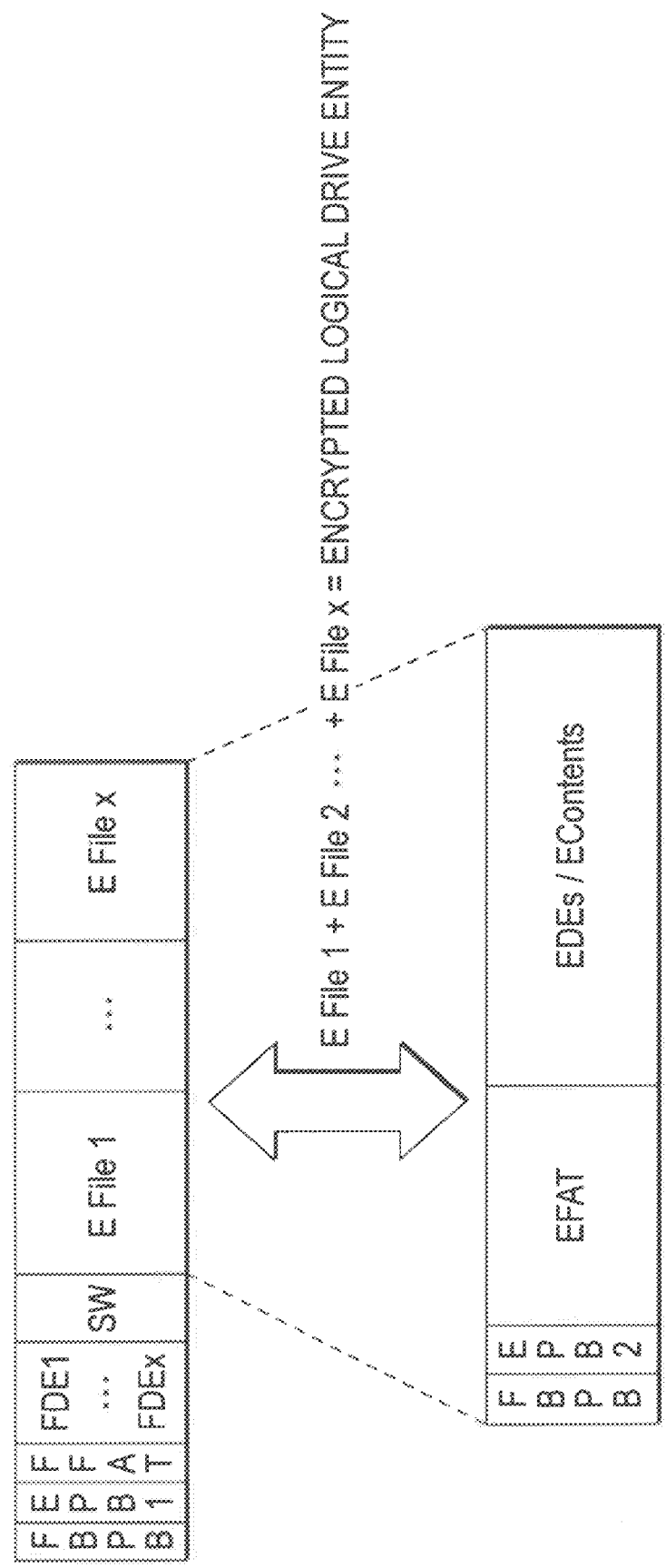
FIG. 3 is a diagram showing the physical allocation of the file system on a storage area in a case of an USB flash memory.

FIGS. 2 and 3 show the physical allocations of the file systems on storage areas in the cases of the storage devices such as a hard disc drive and an USB memory, respectively.

In the case of the hard disc drive shown in FIG. 2 (although the layout of the Fdisk format is shown, the layout is not limited to the Fdisk format so long as the hard disc drive), a MBR (master boot record) is provided at the head portion, then a unused area is secured next to the MBR, and a plurality of the faked logical drive areas each defined by the FAT 32 structure (first file system) are secured next to the unused area. This figure shows a state where a first to x-th logical drive areas are secured.

Figure 10:
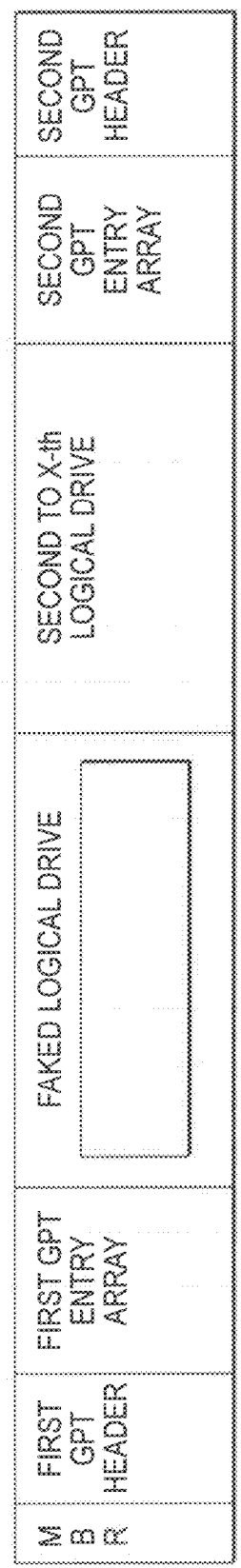
FIG. 10 is a diagram showing the physical allocation of the file system on a storage area in a case of the hard disc drive of 2 T bytes or more.

In the case of 2 T bytes or more, a GPT (GUID partition table) may be used in place of the MBR, and the physical allocation in this case is shown in FIG. 10.

Since each of the faked logical drives is defined by the FAT 32 structure (first file system), the faked logical drive is divided into a faked logical drive parameter area and an encrypted logical drive entity area. The encrypted logical drive serving as the second file system is formed. The faked logical drive parameter area serves as an area for attribute information.

The parameter on the faked logical drive forming the first file system is set in the following manner according to the FAT 32 structure.

An FBPB is a fake bios parameter block (a name for the convenience sake) and has the boot parameter block (BPB) structure in the FAT 32 structure.

An EPB1 is an encryption parameter block No. 1 (a name for the convenience sake) and stores the head position of an EFile 1 described later and the total size of all the EFiles therein in this embodiment. The EPB1 can be disposed at the head portion or the end portion of the second file system entity or a vacant area therein or a plurality of these portions.

That is, the second file system entity (utilizing the areas of EFile 1 to EFile x) according to the second file system is mapped on the first file system entity (EFile 1 to EFile x within the fake drive entity) according to the first file system. Further, the correspondence of the mapping is stored as mapping information in a predetermined area (the EPB1 area disposed at the head portion of the FAT 32 structure in the faked logical drive) in the first file system. In other words, the EPB1 serves as an example of the mapping information storing area.

The EPB1 stores the head position of the EFile 1 and the total size of all the EFiles as well as a peculiar signature.

The FFAT is a fake FAT (a name for the convenience sake) and usually two FFATs are provided. Although this FAT is provided in order to employ the FAT 32 structure, the allocation of the actual file system entity is analyzed based on the head position of the EFile 1 recorded in the EPB1 and the total size of all the EFiles.

FDEs and an SW (they can be disposed at separate locations) are all fake directory entries (a name for the convenience sake) including the encrypted logical drive file. Further, it is possible to provide an arbitrary file used by a user such as the entity of the user mode application.

The EFile 1 to EFile x are the entity of the encrypted logical drive file.

FIG. 3 shows the layout of the super floppy disk format in the case of adding a drive to a large capacity external memory such as a USB flash memory. Such the USB flash memory acts itself as an encrypted logical drive. Predetermined parameter areas for the FAT 32 structure are defined at the head area, and an area for the encrypted logical drive entity (EFile 1 to EFile x) is secured next to the parameter areas.

The following areas are secured within the encrypted logical drive entity.

An EBPB is a bios parameter block for the encrypted logical drive and has the BPB structure in the FAT 32 structure.

An EPB2 is an encryption parameter block No. 2 and holds therein parameters for decoding specific signature or encryption data.

An EFAT (a name for the convenience sake) is an FAT for the encrypted logical drive. Usually, two EFATs are provided and the EFAT is encrypted before the authentication.

An EDEs/EContents (a name for the convenience sake) is the directory entry for the encrypted logical drive or the file contents and is encrypted before the authentication.

Next, the explanation will be made as to how the drive is seen from the software based on these physical allocations.

The drive will be seen in the following manner from the user mode application on a PC not installing the kernel mode software therein.

<View on a Sector Unit Basis>

The physical entity can be directly accessed on a sector unit basis. This is because the method of the embodiment does not change the physical allocation etc.

<Drive Structure on an Explorer>

Figure 4:
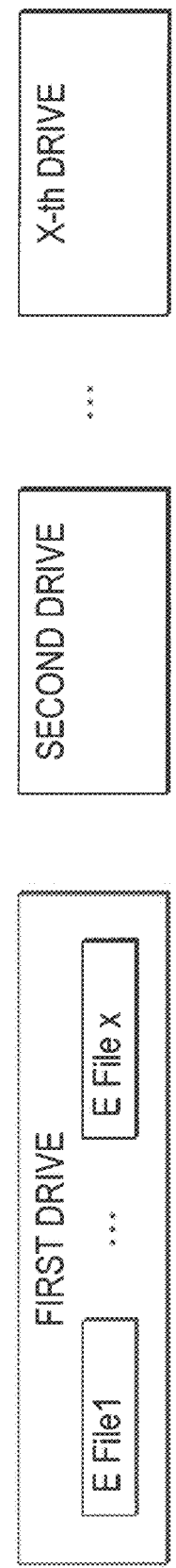
FIG. 4 is a diagram showing a drive structure displayed on an explorer in the case of a hard disc drive.

FIG. 4 shows the drive structure displayed on the explorer in the case of the hard disc drive. X number of files are displayed within the first logical drive (although the first logical drive is shown in the figure, the logical drive is not limited to the first logical drive). As shown in FIG. 2, the x number of file entities as the encrypted logical drive entity are written so as to exist within the faked logical drive parameter of the FAT 32 structure. Further, in the unused area, since "the second file system entity according to the second file system is mapped on the first file system entity according to the first file system and the corresponding relation of the mapping is stored as the mapping information (in the predetermined area in the first file system)", there is no unnecessary vacant area.

The second drive and the succeeding drives not provided with the encrypted logical drive entity are displayed normally. In this embodiment, the encrypted logical drive entity is set within the first logical drive. However, an arbitrary drive or drives may be used as the logical drive or drives, and the remaining drives may be used as the normal drives.

Figure 5:
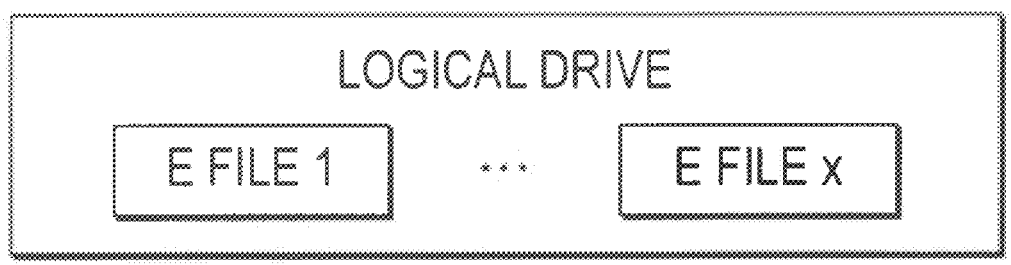
FIG. 5 is a diagram showing a drive structure displayed on the explorer in the case of an USB flash memory.

FIG. 5 shows the drive structure displayed on the explorer in the case of the USB flash memory. X number of files are displayed within this drive. In this case, also, as shown in FIG. 3, the x number of file entities as the encrypted logical drive entity are written so as to exist within the logical drive parameter of the FAT 32 structure. Further, in the unused area, "the second file system entity according to the second file system is mapped on the first file system entity according to the first file system and the corresponding relation of the mapping is stored as the mapping information (in the predetermined area in the first file system)".

On the other hand, the drive structure will be seen in the following manner from a PC installing the kernel mode software therein.

First, the explanation will be made as to a case before the authentication is completed.

<View on a Sector Unit Basis>

The physical entity can not be accessed on a sector unit basis. This is because since the kernel mode software is installed, in order to prevent the modification or deletion of data in an encrypted state, the accessing on the sector unit basis is made impossible as a function of the kernel mode software.

<Drive Structure on an Explorer>

In the case of the hard disc drive, before the authentication, in order to prevent the modification or or deletion of data in an encrypted state, all the logical drives in the hard disc drive are made not to be recognized by a function of the kernel mode software.

In the case of the USB flash memory, in the similar manner, before the authentication, in order to prevent the modification or deletion of data in an encrypted state, all the logical drives in the USB flash memory are made not to be recognized by a function of the kernel mode software.

Next, the explanation will be made as to a case after the authentication.

<Access on a Sector Unit Basis>

Since the decoding is allowed by the authentication, all the area except for the faked logical drive parameter and the size of the EPB2 are recognized, and the accessing from the software is made possible as a function of the kernel mode software.

Figure 6:
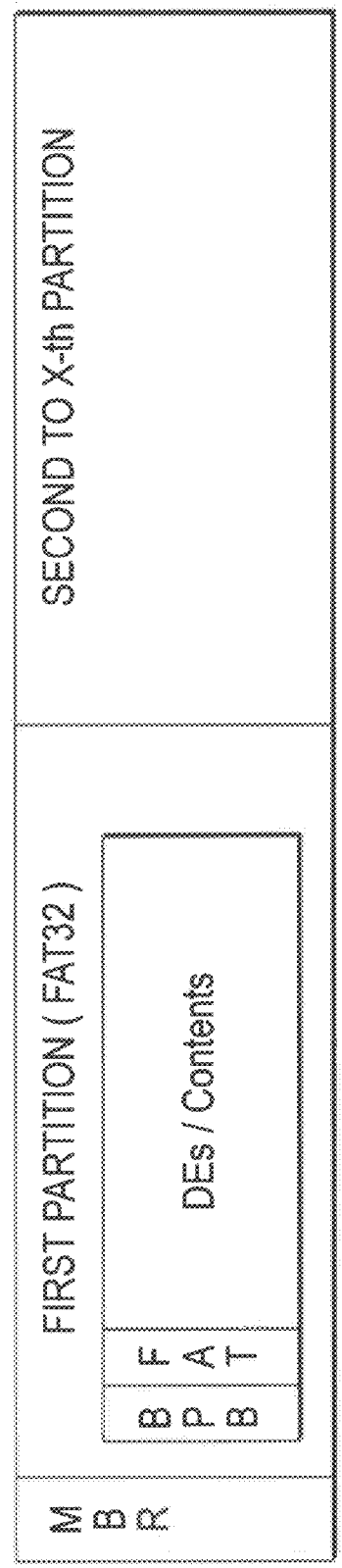
FIG. 6 is a diagram showing an image of an accessing state on a sector unit basis on the hard disc drive after the authentication.

First, FIG. 6 is a diagram showing an image of an accessing state on a sector unit basis on the hard disc drive after the authentication.

In the case of the hard disc drive, in order to more facilitate the accessing on the sector unit basis, according to a function of the kernel mode software, the first logical drive is accessed as if the bios parameter block, the FAT, the directory entries and the file contents of the encrypted logical drive as the second file system are arranged therein.

In order to improve the reliability of the encryption, the accessing to the EPB2 is disabled as a function of the kernel mode software.

FIG. 7 is a diagram also showing an image of an accessing state on a sector unit basis on the USB flash memory after the authentication.

In the case of the USB flash memory, in the almost similar to the hard disc drive, the logical drive is accessed as if the bios parameter block, the FAT, the directory entries and the file contents of the encrypted logical drive are arranged therein.

<Drive Structure on an Explorer>

Due to the presence of the kernel mode software, since the accessing to the encrypted logical drive is realized as a function of the OS, the encryption data of a user exists in a decoded state within the first logical drive. That is, the accessing to the encrypted logical drive (second file system) is realized by the UI of OS which a user usually uses.

Such the display and accessing are quite same in the case of the hard disc drive and also in the case of the USB flash memory.

Figure 8:
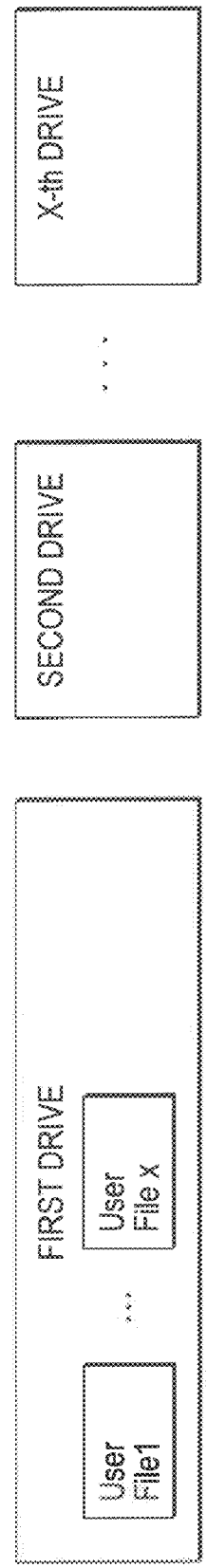
FIG. 8 is a diagram showing a drive structure displayed on the explorer in the case of the hard disc drive after the authentication.
Figure 9:
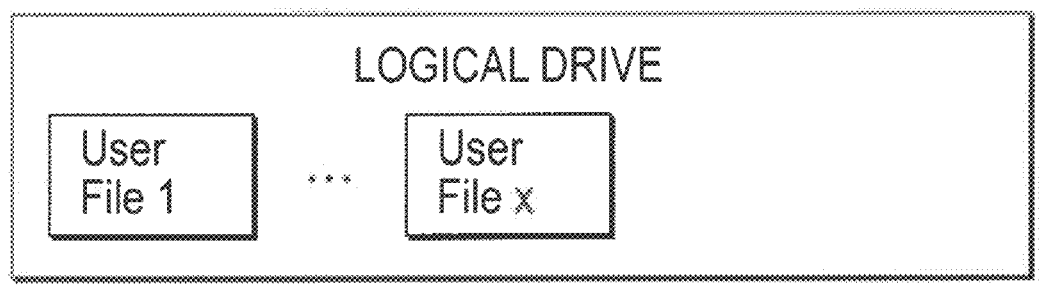
FIG. 9 is a diagram showing a drive structure displayed on the explorer in the case of the USB flash memory after the authentication.

FIG. 8 shows the drive structure displayed on the explorer in the case of the hard disc drive after the authentication. FIG. 9 shows the drive structure displayed on the explorer in the case of the USB flash memory after the authentication.

In any of these cases, since the analysis of the second file system entity has been completed according to the second file system, the files (User File 1 to User File x) prepared by a user are displayed, and the normal accessing (such as writing, reading, erasing) is made possible.

Next, the protection function of the encryption area is explained. That is, this function is the method for preventing the erasure of the encryption area serving as the collection of the second file system entity on the second file system as the file system entity existing on the first file system. The protection function is performed by the access control unit 221 of the storage device 2 shown in FIG. 14. However, this function may be performed by the storage device 2 in cooperation with the PC 1. Further, this function may be performed by the PC 1.

The protection function will be described regarding a case where the kernel mode software is not installed on the PC 1.

In this case, the encrypted logical drive created as a file may be deleted, or the FAT32 logical drive containing such the files may be deleted, as a predicted risk. Further, in this case, plain text data may be stored in a vacant area.

The preventing method realized in this embodiment is as follows.

On the firmware of an encryption storage product (storage device 2), a function is mounted to prepare three patterns of settings as the data writing area settings as follows: an all-area writable setting; an all-area writing inhibition setting; and an MBR/FBPB/GPT/GPT entry array writing inhibition setting.

In this respect, the all-area writing inhibition mode is set at an initial state after the turning-on of the power supply of the product (storage device 2) or the reception of the reset, and all the area is inhibited from writing as to the data writing.

With respect to the all-area writable mode, this mode is set only at the time of creation/deletion of the encryption area, whereby the writing of all the area is allowed at the time of the creation/deletion of the encryption area.

The MBR/FBPB/GPT/GPT entry array writing inhibition mode is set after the authentication at the PC, and the formatting and the area opening are inhibited.

The allowance/inhibition of the data writing may be set for each of areas. Since all the area is inhibited from writing before the authentication, there arises no risk. Further, after the authentication, since each of the parameter block, the MBR and the GPT of the faked logical drive can not be changed, there is no risk of the formatting and the area opening. Further, since the encrypted logical drive file is always exclusively opened to the user mode application, there is no risk of the modification or deletion of a file by others.

Such a mode switching is instructed from the software by combining the commands (medium insertion/ejection, obtaining a capacity etc.) capable of being issued from the OS of user authority. Such a function is a normal function realized relatively in an easy manner.

Next, the preventing method is described regarding a case being accessed the PC having the kernel mode software installed thereon.

In this case, the encrypted logical drive may be formatted or opened, as a predicted risk.

The preventing method realized in this embodiment is as follows.

The preventing method can be realized by installing the service program for preventing the formatting and the area opening on the PC. Such the service program may be provided as a function of the kernel mode software or may be installed simultaneously at the time of installing the kernel mode software. In the case of installing an application separately from the kernel mode software, the kernel mode software may confirm the existence of the application, and may limit the particular function (format or open) when the application does not exist.

The storage device may be formatted for the file system in advance (e.g., before a shipment), or a storage device with the file system of the embodiment unsupported may be formatted to support the file system after the storage device is shipped purchased by a user.

The function for formatting the storage device may be mounted on the kernel mode software or may be provided by dedicated software which can be executed on a computer (PC) connected to the storage device. When the software for the format is executed on the PC 1 shown in FIG. 1, the PC 1 operates as a file system allocating unit configured to allocate a first file system entity created according to a first file system on the storage device 2, such that a second file system entity created according to a second file system is allowed to be mapped within the first file system entity. The file system allocating unit is also configured to define a mapping information storing area on a predetermined area of the first file system entity. The mapping information storing area is reserved for storing mapping information indicating a correspondence of the mapping. As described above, the formatted file system, which has not included any user data yet, may serve as "a file system entity."

As explained above, according to the embodiments, by using the logical drive corresponding to the first file system, a vacant area is not remained while creating the logical drive entity (EFile 1 to EFile x) of the FAT32 structure corresponding to the first file system within the logical drive. Then, the EPB1 is secured within the area of the logical drive parameter in the FAT32 structure corresponding to the first file system, and the EPB1 stores the head position of the logical drive entity and the total size of all the logical drive entity. Thus, the second file system entity (using the area of the logical drive entity) according to the second file system is mapped on the first file system entity (the logical drive entity) according to the first file system, and the correspondence of the mapping is stored on the EPB1 area as the mapping information. Then, the EPB1 area is referred by the kernel mode software or the user mode application to obtain the physical allocation of the second file system entity according to the second file system mapped on the first file system entity. Thereafter, the file system can be used (e.g., writing, reading, erasing) as the file system according to the second file system based on the data of the second file system entity by using any of the softwares.

It will be clear for those skilled in the art that the invention is not limited to the above embodiments and the following modifications are disclosed as another embodiments of the invention.

The elements and configurations mutually replaceable disclosed in the aforesaid embodiments may be suitably combined.

Although not disclosed in the aforesaid embodiments, the elements and configurations of the above embodiments may be suitably replaced by elements and configurations that are known techniques and mutually replaceable thereby, or the combination of the elements and configurations of the aforesaid embodiments may be suitably replaced by the mutually replaceable known techniques.

Although not disclosed in the aforesaid embodiments, the elements and configurations of the above embodiments may be suitably replaced by elements and configurations that are expected for those skilled in the art as alternatives thereof based on the known techniques, or the combination of the elements and configurations of the aforesaid embodiments may be suitably replaced.

What is claimed is:

1. A file system management device connectable to a storage device, the storage device comprising a first file system entity created according to a first file system in which a second file system entity created according to a second file system is allowed to be mapped, wherein a mapping information storing area is defined on a predetermined area of the first file system entity, the mapping information storing area being reserved for storing mapping information indicating a correspondence of the mapping, the file system management device comprising:

an interface configured to connect the file system management device to the storage device via a direct local connection that does not include any intervening network elements; and an accessing unit configured to access the second file system entity based on the mapping information stored at the mapping information storing area defined on the predetermined area of the first file system entity through a process according to the first file system to the first file system entity, the first file system entity comprising an attribute area reserved for storing attribute information of the first file system entity and the attribute area comprises the mapping information storing area, wherein the storage device disables a writing or erasing operation of the first file system entity having the second file system entity mapped therein when an operation under the first file system is received from the file system management device, disables a writing or erasing operation of the attribute information of the first file system entity according to the first file system during an initial activation of the storage device, allows the writing or erasing operation of the attribute information when an access to the second file system entity according to the second file system is received, and disables the writing or erasing operation of the attribute information when the access to the second file system is finished.

2. The file system management device according to claim 1, further comprising:
a mapping unit configured to map the second file system entity in the first file system entity;
a mapping information creating unit configured to create the mapping information; and
a storage control unit configured to store the mapping information on the mapping information storing area of the first file system entity.

3. The file system management device according to claim 2,
wherein the storage control unit is configured to store location information relating to a physical address of the second file system entity as the mapping information on the predetermined area of the first file system entity.

4. The file system management device according to claim 3,
wherein the storage control unit is configured to store the mapping information on an unallocated area at a specific position of the first file system entity.

5. A file system management device connectable to a storage device, the file system management device comprising:
an interface configured to connect the file system management device to the storage device via a direct local connection that does not include any intervening network elements;
a file system allocating unit configured to allocate a first file system entity created according to a first file system, such that a second file system entity created according to a second file system is allowed to be mapped within the first file system entity, wherein
the file system allocating unit is configured to define a mapping information storing area on a predetermined area of the first file system entity, the mapping information storing area being reserved for storing mapping information indicating a correspondence of the mapping, the first file system entity comprising an attribute area reserved for storing attribute information of the first file system entity and the attribute area comprises the mapping information storing area, and
the storage device disables a writing or erasing operation of the first file system entity having the second file system entity mapped therein when an operation under the first file system is received from the file system management device, disables a writing or erasing operation of the attribute information of the first file system entity according to the first file system during an initial activation of the storage device, allows the writing or erasing operation of the attribute information when an access to the second file system entity according to the second file system is received, and disables the writing or erasing operation of the attribute information when the access to the second file system is finished.

6. The file system management device according to claim 5, the file system allocating unit allocates the mapping information storing area on an unallocated area at a specific position of the first file system entity.

7. A storage device comprising:
an interface configured to connect the storage device to a file system management device via a direct local connection that does not include any intervening network elements;
a first file system entity created according to a first file system in which a second file system entity created according to a second file system is allowed to be mapped;
a mapping information storing area defined on a predetermined area of the first file system entity, the mapping information storing area being reserved for storing mapping information indicating a correspondence of the mapping, the first file system entity comprising an attribute area reserved for storing attribute information of the first file system entity and the attribute area comprises the mapping information storing area; and
an access control unit configured to:
disable a writing or erasing operation of the first file system entity having the second file system entity mapped therein when an operation under the first file system is received from the file system management device,
disable a writing or erasing operation of the attribute information of the first file system entity according to the first file system during an initial activation of the storage device,
allowing the writing or erasing operation of the attribute information when an access to the second file system entity according to the second file system is received, and
disable the writing or erasing operation of the attribute information when the access to the second file system is finished.

8. The storage device according to claim 7,
wherein the mapping information storing area stores thereon location information relating to a physical address of the second file system entity as the mapping information on the predetermined area of the first file system entity.

9. The storage device according to claim 7,
wherein the mapping information storing area is located on an unallocated area at a specific position of the first file system entity.

10. The storage device according to claim 7,
wherein the access from the file system management device is performed based on user mode application operable on an operation system on the file system management device,
wherein, when a start of the user mode application is detected, the access control unit allows the writing or erasing operation of the attribute information of the first file system entity and opens the first file system entity exclusively to the user mode application, such that the writing or erasing operation from others is disabled based on a logical regulation of the operating system,
wherein, when an exit of the user mode application is detected, the access control unit disables the writing or erasing operation of the attribute information.

11. A non-transitory computer-readable medium having a computer program stored thereon and readable by a computer, the computer program, when executed by the computer, causes the computer to perform operations for a file system management device connectable to a storage device via a direct local connection that does not include any intervening network elements, the storage device comprising a first file system entity created according to a first file system in which a second file system entity created according to a second file system is allowed to be mapped, wherein a mapping information storing area is defined on a predetermined area of the first file system entity, the mapping information storing area being reserved for storing mapping information indicating a correspondence of the mapping, the first file system entity comprising an attribute area reserved for storing attribute information of the first file system entity and the attribute area comprises the mapping information storing area, the operations comprising:

processing the first file system entity according to the first file system;

obtaining the mapping information stored at the mapping information storing area defined on the predetermined area of the first file system entity by the process to the first file system entity;

accessing the second file system entity based on the mapping information;

disabling, by the storage device, a writing or erasing operation of the first file system entity having the second file system entity mapped therein when an operation under the first file system is received from the file system management device;

disabling, by the storage device, a writing or erasing operation of the attribute information of the first file system entity according to the first file system during an initial activation of the storage device;

allowing, by the storage device, the writing or erasing operation of the attribute information when an access to the second file system entity according to the second file system is received; and disabling, by the storage device, the writing or erasing operation of the attribute information when the access to the second file system is finished.

12. The computer-readable medium according to claim 11, wherein the computer program is a file system driver installed on an operating system.

13. A non-transitory computer-readable medium having a computer program stored thereon and readable by a computer, the computer program, when executed by the computer, causes the computer to perform operations for a file system management device connectable to a storage device via a direct local connection that does not include any intervening network elements, the operations comprising:

allocating a first file system entity created according to a first file system, such that a second file system entity created according to a second file system is allowed to be mapped within the first file system entity;

defining a mapping information storing area on a predetermined area of the first file system entity, the mapping information storing area being reserved for storing mapping information indicating a correspondence of the mapping, the first file system entity comprising an attribute area reserved for storing attribute information of the first file system entity and the attribute area comprises the mapping information storing area;

disabling, by the storage device, a writing or erasing operation of the first file system entity having the second file system entity mapped therein when an operation under the first file system is received from the file system management device;

disabling, by the storage device, a writing or erasing operation of the attribute information of the first file system entity according to the first file system during an initial activation of the storage device;

allowing, by the storage device, the writing or erasing operation of the attribute information when an access to the second file system entity according to the second file system is received; and disabling, by the storage device, the writing or erasing operation of the attribute information when the access to the second file system is finished.

14. A file system management device connectable to a storage device, said file system management device comprising:

an interface configured to connect the file system management device to the storage device; and a file system allocating unit configured to allocate a first file system entity created according to a first file system, such that a second file system entity created according to a second file system is allowed to be mapped within the first file system entity, wherein the file system allocating unit is configured to define a mapping information storing area on a predetermined area of the first file system entity, the mapping information storing area being reserved for storing mapping information indicating a correspondence of the mapping, and the first file system has a file allocation table (FAT) structure including a boot parameter block (BPB) and an encryption parameter block (EPB), and the mapping information storing area is defined in the EPB.

* * * * *